US007148456B2

(12) United States Patent
Agrawal et al.

(10) Patent No.: US 7,148,456 B2
(45) Date of Patent: Dec. 12, 2006

(54) METHOD AND APPARATUS FOR MICROWAVE PHOSPHOR SYNTHESIS

(75) Inventors: Dinesh K. Agrawal, State College, PA (US); Christopher Y. Fang, State College, PA (US)

(73) Assignee: The Penn State Research Foundation, University Park, PA (US)

( * ) Notice: Subject to any disclaimer, the term of this patent is extended or adjusted under 35 U.S.C. 154(b) by 0 days.

(21) Appl. No.: 10/941,625

(22) Filed: Sep. 15, 2004

(65) Prior Publication Data

US 2006/0054618 A1    Mar. 16, 2006

(51) Int. Cl.
*H05B 6/24* (2006.01)

(52) U.S. Cl. ...................... 219/679; 219/678
(58) Field of Classification Search ............. 219/679, 219/678, 601, 680; 204/157.73, 157.45, 204/157.6
See application file for complete search history.

(56) References Cited

U.S. PATENT DOCUMENTS

| | | | | |
|---|---|---|---|---|
| 4,044,279 | A | * | 8/1977 | Tsuzurahara et al. .... 315/39.51 |
| 5,110,216 | A | * | 5/1992 | Wickersheim et al. ...... 374/122 |
| 6,054,693 | A | * | 4/2000 | Barmatz et al. ............ 219/678 |
| 6,222,168 | B1 | * | 4/2001 | Witonsky et al. ........... 219/687 |
| 6,263,830 | B1 | * | 7/2001 | Kamarehi et al. .. 118/723 MW |
| 6,297,479 | B1 | * | 10/2001 | Wefers ....................... 219/388 |
| 6,380,525 | B1 | * | 4/2002 | Dalton ........................ 219/759 |
| 6,410,896 | B1 | * | 6/2002 | Witonsky et al. ........... 219/689 |
| 6,442,866 | B1 | * | 9/2002 | Wefers ......................... 34/263 |
| 6,552,295 | B1 | * | 4/2003 | Markunas et al. ..... 219/121.36 |
| 6,803,237 | B1 | * | 10/2004 | Manganini et al. ......... 436/175 |
| 6,943,316 | B1 | * | 9/2005 | Konavko et al. ........ 219/121.4 |

OTHER PUBLICATIONS

Rustum Roy, S. Komarneni and L.J. Yang; "Controlled Microwave Heating And Melting Of Gels"; J. Am. Ceram. Soc., 68[7] pp. 392-395 (1985).

Yi Fang; "Utilization Of Microwaves In Ceramic Processing"; pp. iii-x (Dec. 1994).

Rustum Roy, D. Agrawal, J.P. Chen and M. Mathis; "Microwave Processing: Triumph Of Applications-Driven Science In WC-Composites And Ferroic Titanates"; Microwaves: Theory And Application In Materials Processing IV; Ceramic Transactions; vol. 80; pp. 3-25; (1993).

Y. Fang, D. K. Agrawal, D. M. Roy and R. Roy; "Fabrication Of Transparent Hydroxyapatite Ceramics By Ambient-Pressure Sintering"; Materials Letters 23; pp. 147-151; (Apr. 1995).

Y. Fang, R. Roy D. K. Agrawal and D. M. Roy; "Transparent Mullite Ceramics From *Diphasic aerogeis* By Microwave And Conventional Processings"; Materials Letters 28; pp. 11-15; (Sep. 1996).

(Continued)

*Primary Examiner*—Daniel Robinson
(74) *Attorney, Agent, or Firm*—The Webb Law Firm

(57) ABSTRACT

A method of microwave synthesis of phosphors includes a microwave furnace having a microwave chamber; providing starting material in the microwave chamber; and subjecting the starting material to microwaves, whereby the starting material is synthesized into phosphors. An insulation package for use in microwave synthesis is disclosed that includes an insulator having an opening therein, wherein the opening is substantially symmetrically disposed in relation to a central axis of the insulator, and wherein the opening is adapted to receive starting material. A susceptor configuration may be positioned within the cavity, wherein the insulator, the cavity, and the susceptor configuration are substantially symmetrically disposed in relation to an axis of rotation of the insulation package. A microwave furnace for continuous microwave synthesis of phosphors is also disclosed.

31 Claims, 8 Drawing Sheets

Type 2213 = conventional fluxed LAP
MW02B = LAP 2 microwaved at 1100°C/10min with flux
MW02A = LAP 1 microwaved at 1125°C/30min without flux
MW24A = LAP 7 microwaved at 885±75°C/10min with flux
MW20B = LAP 9 microwaved at 1020°C/10min without flux

OTHER PUBLICATIONS

Y. Fang, D. K. Agrawal, D.M. Roy and R. Roy; "Rapid Sintering Of Hydroxyapatite Ceramics By Microwave Processing"; Ceramic Transactions; vol. 21: pp. 348-355; (1991).

Yi Fang; Jiping Cheng; R. Roy, D. M. Roy and D. K. Agrawal; "Enhancing Densification Of Zirconia-Containing Ceramic-Matrix Composites By Microwave Processing"; Journal of Materials Science 32; pp. 4925-4930; (1997).

Y. Fang, D. K. Agrawal and D. M. Roy; "Thermal Stability Of Synthetic Hydroxyapatite"; Hydroxyapatite and Related Materials, ed. P. W. Brown & B. Constants, CRC Press; pp. 269-282; (1994).

Y. Fang, D. K. Agrawal, D. M. Roy, R. Roy and P. W. Brown; "Ultrasonically Accelerated Synthesis Of Hydroxyapatite"; J. Mater, Res., vol. 7, No. 8, pp. 2294-2298; (Aug. 1992).

Yi Fang, Dinesh K. Agrawal, Della M. Roy and Rustum Roy; "Fabrication Of Porous Hydroxyapatite Ceramics By Microwave Processing"; J. Mater Res., vol. 7, No. 2, pp. 490-494; (Feb. 1992).

Dinesh K. Agrawal, Y. Fang, D.M. Roy and R. Roy; "Fabrication Of Hydroxyapatite Ceramics By Microwave Processing"; Mat. Res. Soc. Symp. Proc. vol. 269; pp. 231-236; (1992).

Y. Fang, D. M. Roy, J. Cheng, R. Roy and D. K. Agrawal; "Microwave Sintering Of Hydroxyapatite-Based Composites"; Ceramic Transactions, vol. 36, Am. Ceram. Soc.; pp. 397-407; (1993).

Jiashan Hu, D. K. Agrawal, Yi Fang and R. Roy; "Synthesis Of Hydroxyapatite Using Phosphate-Rich Glasses In The System CaO-$P_2O_5$-$H_2O$ And Acoustic Waves"; Journal Of Materials Science 28; pp. 5297-5300; (1993).

Yi Fang, Dinesh K. Agrawal, Della M. Roy and Rustum Roy; "Microwave Sintering Of Hydroxyapatite Ceramics"; J. Mater. Res., vol. 9, No. 1, pp. 180-187) (Jan. 1994).

Yi Fang, Jiping Cheng and Dinesh K. Agrawal; "Effect Of Powder Reactivity On Microwave Sintering Of Alumina"; Materials Letters 58; pp. 498-501; (2004).

D. Ravichandran, Shikik T. Johnson, S. Erdei, Rustum Roy and William B. White; "Crystal Chemistry And Luminescence Of The $EU^{2+}$-Activated Alkaline Earth Aluminate Phosphors"; Displays 19, pp. 197-203; (1999).

D. Ravichandran, Rustum Roy and William B. White; "One Step Microwave Firing Of $Ce_{1-x}TbxMgAl_{11}O_{10}$ Green Phosphors"; Third International Conference On The Science And Technology Of Display Phosphors; 11 pages; (Nov. 3-5, 1997).

* cited by examiner

Type 2213 = conventional fluxed LAP
MW02B = LAP 2 microwaved at 1100°C/10min with flux
MW02A = LAP 1 microwaved at 1125°C/30min without flux
MW24A = LAP 7 microwaved at 885±75°C/10min with flux
MW20B = LAP 9 microwaved at 1020°C/10min without flux

METHOD AND APPARATUS FOR MICROWAVE PHOSPHOR SYNTHESIS

BACKGROUND OF THE INVENTION

1. Field of the Invention

The present invention relates to microwave processing and, more specifically, to a method of and apparatus for phosphor synthesis.

2. Description of Related Art

Microwave processing has been conducted on various substances (i.e., starting materials) including ceramics, composites, cermets, hard metals, electronic ceramics, metallic materials, etc. The general features of microwave processing of materials include volumetric and selective heating, enhanced reaction kinetics, the potential to improve product quality, process simplification, and the potential of cost reduction.

Microwave processing of ceramic materials is a dielectric heating process. The mechanism of microwave heating is inherently different from that of conventional heating. In microwave heating, heat is generated within the materials exposed to the microwave field through microwave-material interactions, whereas during conventional heating, heat is transferred from the heating element to the surface of the load by radiation and convection, then to the center of the load by thermal conduction. The absorption of microwave energy by the load in a microwave cavity depends on the dielectric loss factor of the materials in the microwave field. For the highly lossy materials, microwave processing can bring about substantial savings in time and energy with improved quality of the product. For example, regular, porous, and transparent hydroxapatite (HAp) ceramics have been fabricated by microwave processing within a few minutes; $Ba(Zn_{1/3}Ta_{2/3})O_3$ has been sintered to full density by microwave processing within 30 minutes at 1300–1400° C. compared to conventional sintering of the same material that requires 1600° C. and as long as 24 hours.

With reference to synthesis of fluorescent lamp phosphors, in order for activators to be incorporated into the crystal lattice structure of a host material, a high-temperature thermal treatment is necessary. Conventional processing of fluorescent lamp phosphors includes blending of the starting materials, loading the mixtures into crucibles, and firing at a high temperature for several hours. Additional finishing steps may include milling, washing to remove residual materials, filtering, drying, and blending. Although flux may be used to lower the firing temperature and accelerate the synthesis, the time length for synthesizing fluorescent lamp phosphors via conventional processing may still last anywhere from 8–12 hours. Further, contamination due to the volatiles from the conventional process can be of a concern. Additionally, the resultant phosphor obtained from a conventional process is a hard caked substance, thereby requiring the need to grind up the phosphor prior to utilization. As has been described, the conventional process of phosphor synthesis is not only complex, but also requires significant time and energy.

Therefore, it would be an advantage to lower the complexity and amount of time and energy utilized in obtaining fluorescent phosphors.

SUMMARY OF THE INVENTION

The present invention addresses a microwave processing method and apparatus for optimizing the synthesis of phosphors and in particular, fluorescent lamp phosphors. Specifically, the present invention substantially enhances the kinetics of phosphor synthesis through microwave processing. Namely, the soaking time at the final temperature in the microwave process is reduced by up to 90% of the time needed in a conventional process. In addition to the time and energy savings, microwave processing makes it possible to synthesize high quality phosphors without using any flux, thereby reducing contamination and lowering operating costs. Microwave processing causes the resultant phosphor to assume a fine powder property, which therefore, reduces the amount of steps necessary to reduce the phosphor into a usable form. The optimal fluorescent lamp phosphors that may be produced by the present invention may be white, clean, loose, fine powders.

An insulation package for microwave synthesis of phosphors includes an insulator having an opening therein, wherein the opening is substantially symmetrically disposed in relation to a central axis of the insulator, and wherein the opening is adapted to receive starting material. A susceptor configuration may be positioned within the cavity, wherein the insulator, the cavity, and the susceptor configuration are substantially symmetrically disposed in relation to an axis of rotation of the insulation package.

A microwave furnace for continuous microwave synthesis of phosphors includes a tube for receiving starting material, wherein the tube includes a first end and a second end; an insulator having a throughbore, wherein the tube extends therethrough; a microwave chamber for receiving the tube and the insulator, wherein the tube, the insulator, and the microwave chamber are in substantially parallel relation to each other; and at least one microwave head for directing microwaves into the microwave chamber.

Any microwave utilized in the present invention may be configured to provide a user-defined atmospheric environment, wherein the atmospheric environment includes one or more of a reduction in atmospheric pressure in relation to the atmospheric pressure outside of the microwave chamber; an increase in atmospheric pressure in relation to the atmospheric pressure outside of the microwave chamber; and an introduction of one or more gases into the microwave chamber.

A method for obtaining phosphors through microwave synthesis is also included. The present invention may be utilized for synthesis of various phosphors including, but not limited to halophosphate, barium-magnesium aluminate, lanthanum phosphate, and europium doped yttrium oxide. The method of microwave synthesis may encompass the use of the insulation package and the microwave furnace. Optimal phosphors may be synthesized if the starting material is deposited into a low microwave absorbing insulator of particular geometric design and then subjected to an even distribution of microwave radiation. Specifically, the insulator includes an opening that is substantially symmetrically disposed in relation to a central axis of the insulator. This geometric design, in addition to an optional susceptor configuration or other heat management object or device, is conducive to obtaining optimal synthesized phosphors.

These and other advantages of the present invention will be understood from the description of the desirable embodiments, taken with the accompanying drawings, wherein like reference numbers represent like elements throughout.

DETAILED DESCRIPTION OF THE INVENTION

Figure 1:
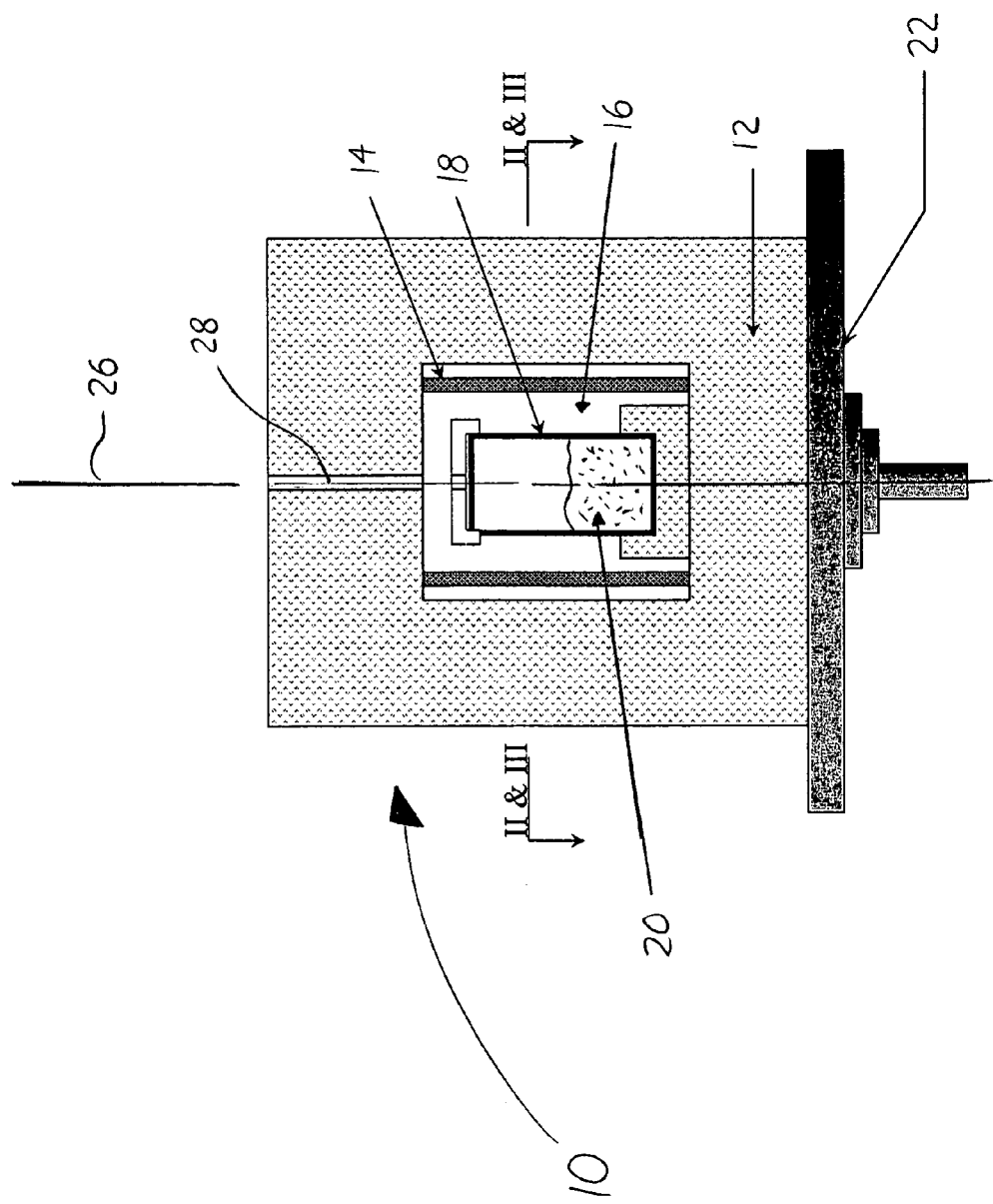
FIG. 1 is a side cross-sectional view of an insulation package on a microwave turntable in a batch processing configuration in accordance with the present invention.
Figure 2:
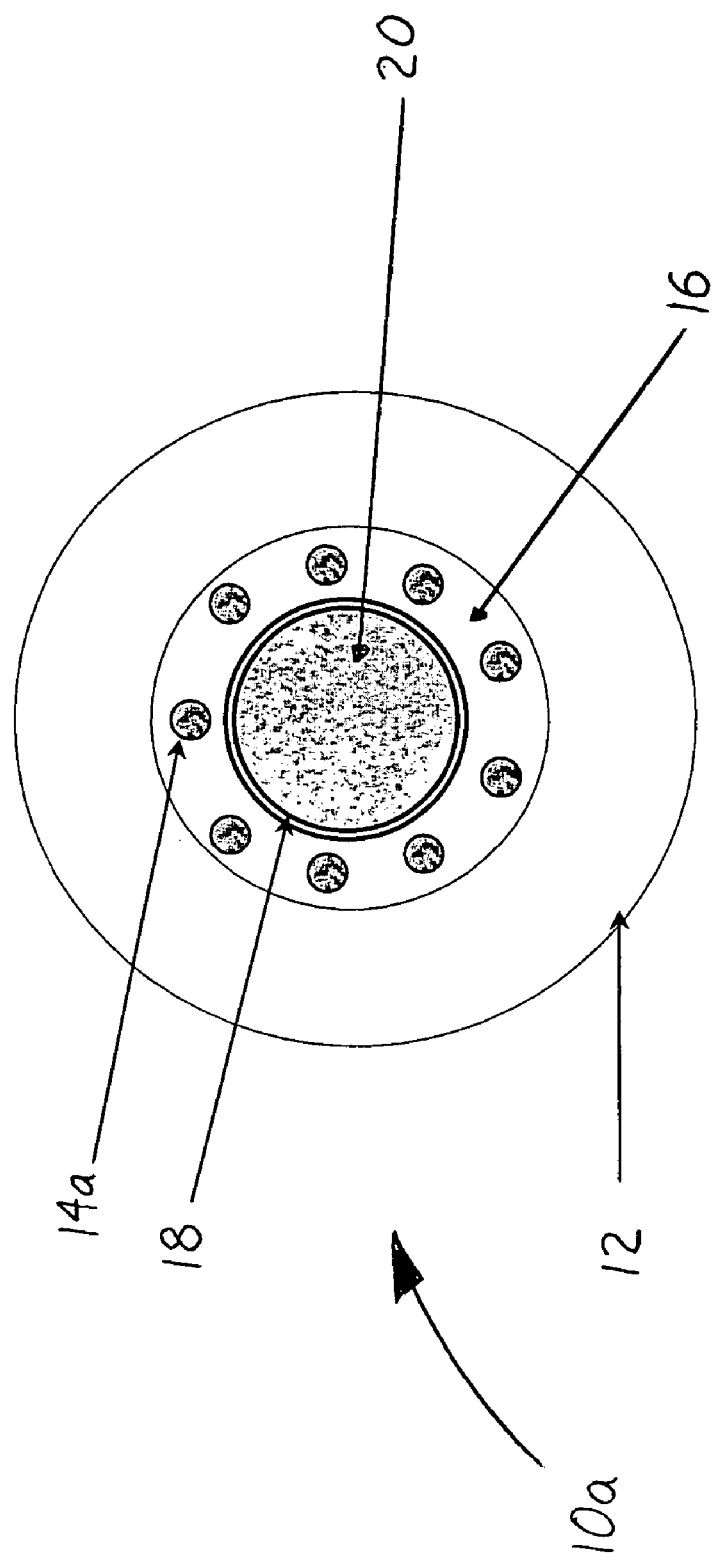
FIG. 2 is a top view of the insulation package of FIG. 1 according to a first embodiment along the lines II—II.
Figure 3:
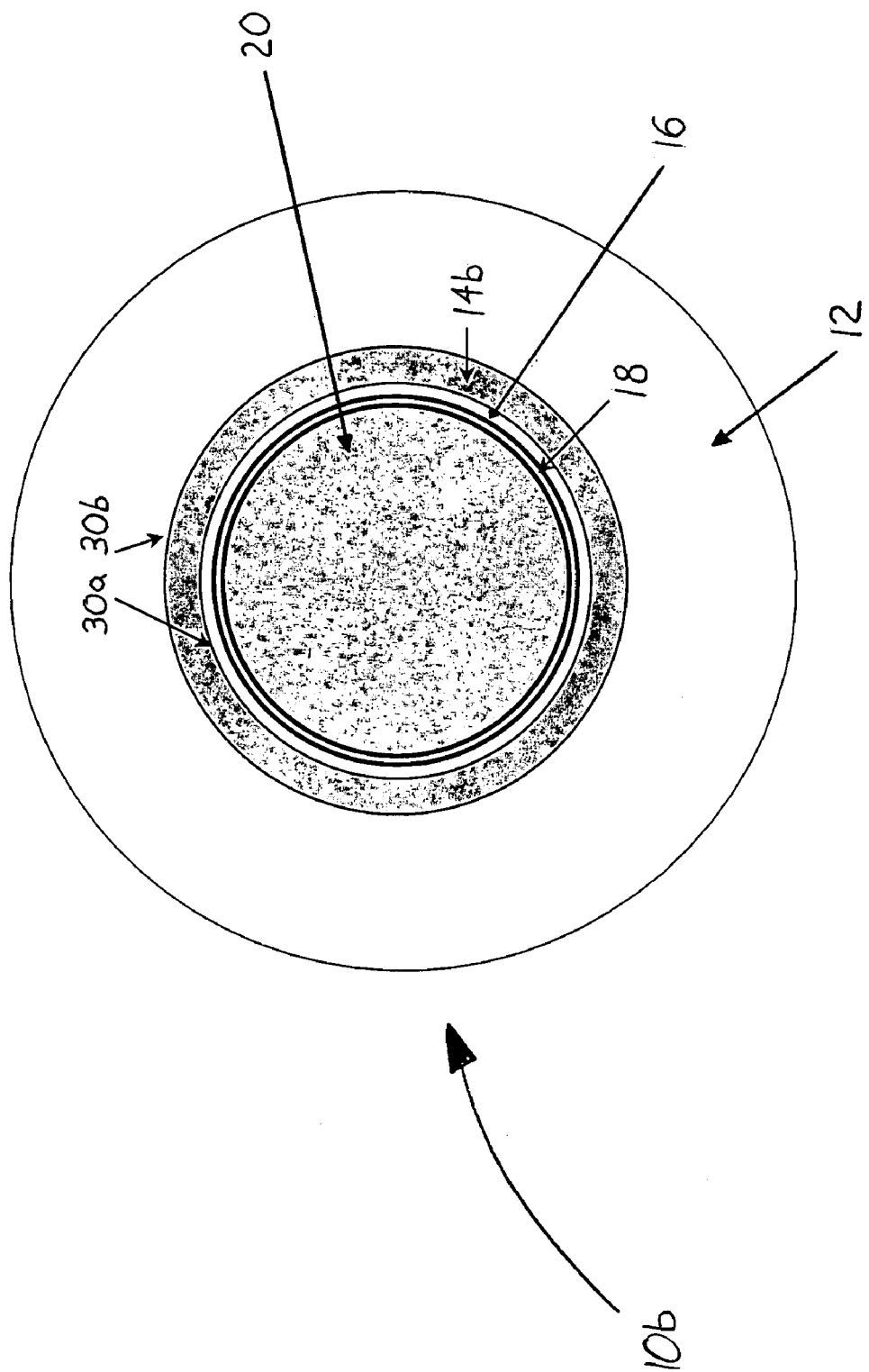
FIG. 3 is a top view of the insulation package of FIG. 1 according to a second embodiment along the lines III—III.
Figure 4:
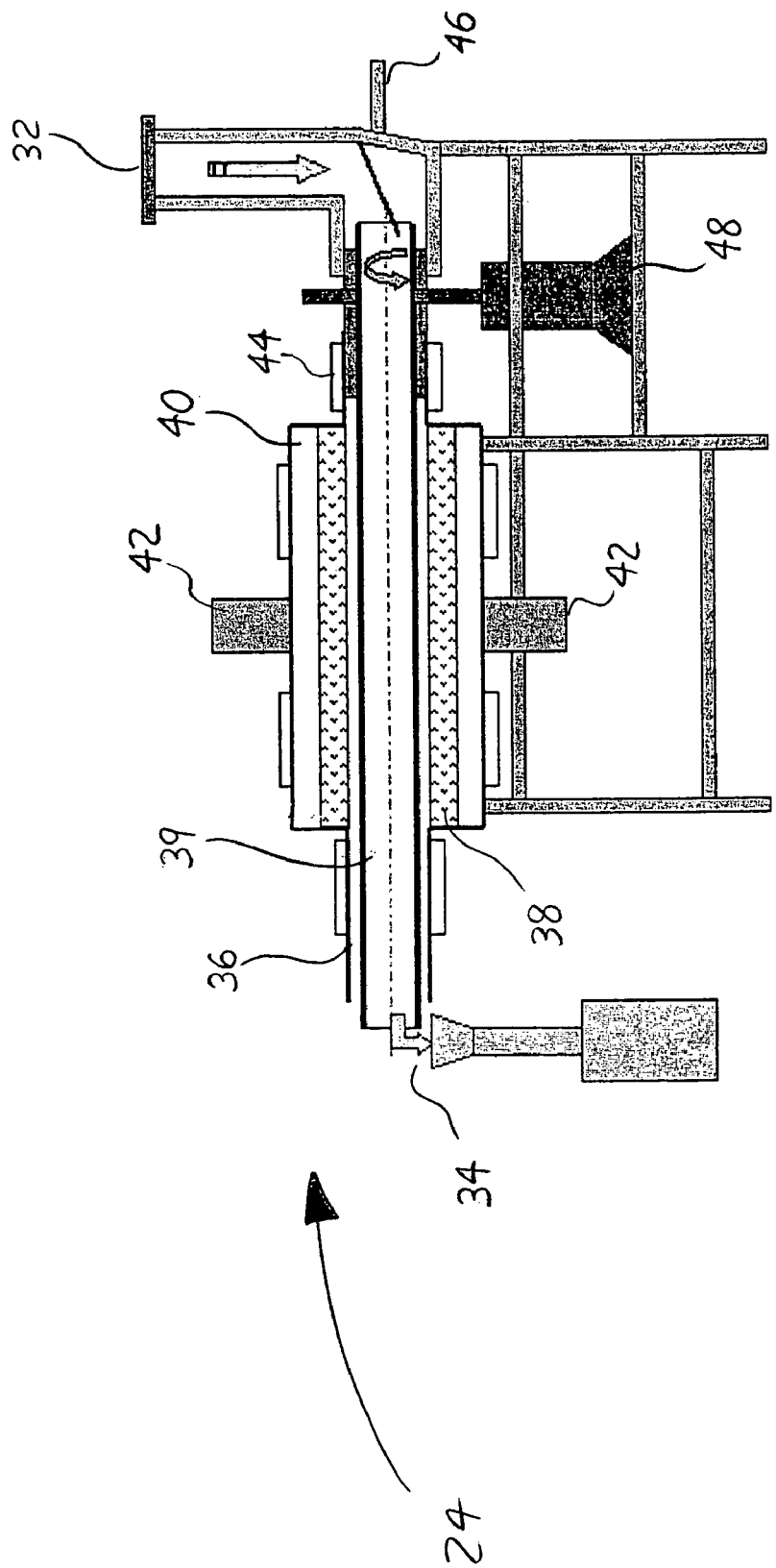
FIG. 4 is a side cross-sectional view of a microwave furnace in a continuous processing configuration in accordance with the present invention.

An insulation package 10 for use in batch microwave synthesis of phosphors is illustrated in FIGS. 1–3. As depicted in FIG. 1, the insulation package 10 desirably includes an insulator 12 and one or more susceptors 14. The insulator 12 includes an opening, such as cavity 16, adapted to support a crucible 18 having a starting material 20 therein. In the context of microwave synthesis, the insulation package 10 may be positioned onto a turntable 22 of a microwave furnace (not shown). In contrast to the batch microwave synthesis afforded by the insulation package 10, FIG. 4 illustrates a microwave furnace 24 adapted for continuous microwave synthesis. The configuration conducive to optimal synthesis of phosphors, as embodied in the insulation package 10, is also embodied within the construction of the microwave furnace 24.

Returning to FIG. 1, the insulator 12 of the insulation package 10 is desirably constructed of insulating material, such as aluminosilicate fibers, alumina fibers, or boron nitride fibers, that is porous in structure, lightweight, chemically stable, thermally stable, has excellent thermal insulation, and has low microwave absorption properties. It is to be understood that the type of insulating material utilized is dependent on the required processing conditions, especially temperature range and atmosphere. Desirably, the refractory material utilized for the insulator 12 is essentially transparent to microwaves in the working temperature range. One such insulating material is known as FiberFrax®, manufactured by Unifrax Corporation of Niagara Falls, N.Y.

Desirably, the insulation package 10 is of a symmetrical design relative to an axis of rotation, which in this embodiment is a vertical axis 26. Thus, the insulator 12, the susceptors 14, and the cavity 16 are symmetrically disposed in relation to the rotational axis or vertical axis 26. Thus, as shown in FIGS. 1–3, the geometrical configuration of the insulator 12 is cylindrical and the geometrical arrangement of the susceptors 14 is cylindrical. The axial symmetry of the insulator package 10 allows the starting material 20 to be uniformly radiated by microwaves through the rotation about the vertical axis 26 via the turntable 22. The symmetry ensures uniform temperature distribution, which is conducive to the optimal synthesis of phosphors. The insulator 12 may include an opening 28 that permits a temperature measuring device, such as a pyrometer (not shown), to measure the temperature of the workload within the cavity 16.

It is to be understood that the insulation package 10 may embody various configurations conducive to optimal microwave synthesis of phosphors. Each configuration may include a different layout or form of the one or more susceptors 14. As is known in the art, a susceptor has multiple functions, including partitioning microwaves, adjusting energy distribution, and compensating heat loss from a surface of an object. The use of the susceptors 14 in the context of the present invention is to improve microwave heating efficiency and achieve uniform microwave heating of the starting material 20. It is to be understood that it is important to achieve uniform temperature distribution for optimal microwave heating. Thus, the geometric configuration of the insulator 12 and the susceptor 14 are important for obtaining uniform heating.

For batch processing, the use of one or more susceptors 14 will allow for more efficient microwave heating. However, it is to be understood that the combination of the type, amount, and configuration of one or more susceptors 14 is important. For example, silicon carbide (SiC) is considered as a good susceptor 14, yet cannot be used at high temperatures in reducing atmosphere, as an SiC susceptor will be reduced to silicon. Due to most ceramic materials having very little microwave absorption at low temperatures, using an appropriate susceptor will help preheat the starting material to such a temperature range that the starting material 20 will begin absorbing microwaves efficiently. It is to be understood, that the partitioning of the microwave energy between the starting material 20 and the susceptor 14 is important. The greater the amount of the susceptor 14 in relation to the starting material 20, the less microwave energy is available to the starting material and, therefore, microwave radiation to the starting material 20 may be reduced. Desirably, in order to achieve an optimal microwave effect, the amount of susceptor 14 should be limited to a minimum amount necessary.

Thus, there are various configurations of susceptors that may be utilized in the present invention. For example, a first embodiment insulation package 10a is depicted in FIG. 2. The first embodiment insulation package 10a includes a plurality of susceptor rods 14a arranged in a circular configuration within the cavity 16. Desirably, each of the susceptor rods 14a is longer than the crucible 18 in order to compensate for heat loss from the top and bottom of the cavity 16. Desirably, each susceptor rod of the first embodiment insulation package 10a is constructed of composite granular susceptors encased in alumina tubing, or other suitable tubing including, but not limited to mullite, fused quartz, MgO, and $ZrO_2$. The granular susceptors may be SiC grains, SiC—$Al_2O_3$ mixture, zirconia, $MoSi_2$, ferrite, or other microwave absorbing materials. In an alternate embodiment (not shown) of the first embodiment insulation package 10a, each of the susceptor rods 14a may be constructed as unitary sintered susceptor rods which do not necessarily include any encasing tubing.

With reference to FIG. 3, and with continuing reference to FIG. 2, a second embodiment insulation package 10b is shown. Similar to the first embodiment insulation package 10b, composite granular susceptors 14b may be encased by an inner alumina tube 30a and an outer alumina tube 30b. Either the inner alumina tube 30a, the outer alumina tube 30b, or both may be constructed of other suitable material including, but not limited to mullite, fused quartz, MgO, and $ZrO_2$. A comparison of FIG. 2 to FIG. 3, shows that the overall difference between the first embodiment insulation package 10a and the second embodiment insulation package 10b, is the susceptor configuration. The second embodiment insulation package 10b substitutes the circular equidistant multiple susceptor rod configuration with a cylindrical susceptor configuration. Use of one susceptor configuration over another susceptor configuration is dictated by the synthesis application. For example, due to the configuration of the susceptors 14a, the first embodiment insulation package 10a allows more microwaves to directly radiate to the starting material 20 and, therefore, the preferred embodiment of the present invention is the first embodiment insulation package 10a. The second embodiment insulation package 10b having the composite granular susceptors 14b encased within the inner and outer alumina tubes 30a, 30b may be utilized when sensitive starting material 20 is subjected to microwaves or when susceptor rods 14a are not readily available.

The crucible 18 for use with the insulation packages 10a, 10b may be constructed of alumina or any other suitable ceramic material. The crucible 18 is dimensioned so that the starting material 20 is prevented from forming a "hot spot" within the center of the starting material 20. For example, if the crucible 18 is too thick, thermal runaway may occur if the center of the starting material 20 becomes too hot. Additionally, the crucible 18 is sized to fit within the cavity 16.

The microwave furnace for use with the insulation packages 10a, 10b may be a 6 kW batch microwave multimode system operating at 2.45 GHz. The microwave furnace may also be equipped with a vacuum pump and a proper atmospheric controlling system (both not shown) for maintaining a desired atmosphere within the insulation package 10 as well as the whole microwave chamber. Thus, the microwave synthesis may be conducted under various controlled atmospheric conditions.

With reference to FIG. 4, and with continuing reference to FIGS. 1–3, the microwave furnace 24 for continuous microwave synthesis is depicted. The microwave furnace 24 includes a starting material inlet 32 desirably in fluid communication with a powder outlet 34 via a rotatable tube, such as an alumina tube 36, situated therebetween. It is to be understood that the rotatable tube may be constructed of other suitable material. Insulation 38, similar in construction to the insulator 12 of the insulation packaging 10, envelopes an outer diameter of the alumina tube 36. Desirably, the alumina tube 36 extends through an opening extending through a central axis of the insulation 38, such as a throughbore 39. It is to be understood that the alumina tube 36 and the insulation 38 are of a symmetrical design, similar to the geometric symmetry embodied by the insulation package 10. The alumina tube 36 and the insulation 38 are situated within a microwave chamber 40. One or more microwave heads 42 are configured to produce microwaves and to direct the microwaves into the microwave chamber 40. The microwave furnace 24 may include a water cooling apparatus 44 for preventing the metallic wall of the microwave chamber and the ceramic tube from overheating. A gas inlet 46 for transmitting gas therethrough is connected to the starting material inlet 32. Specifically, the gas inlet 46 is configured to direct the gas against or through the incoming starting material 20 to cause the starting material 20 to enter the alumina tube 36. A rotary motor 48 imparts rotation upon the alumina tube 36.

In operation, the starting material 20 is continuously fed from one end of the alumina tube 36 and is continuously discharged from the other end of the alumina tube 36. The starting material inlet 32 or one end of the alumina tube 36 of the microwave furnace 24 may be raised to tilt the microwave furnace 24 to facilitate the movement of the starting material 20 through the alumina tube 36 to the powder outlet 34. Due to the rotation of the tilted alumina tube 36 by the rotary motor 48, the starting material continually moves inside the alumina tube 36 as it is synthesized into a phosphor. Thus, the alumina tube 36 is the functional equivalent of the crucible 18 in the batch processing configuration shown in FIG. 1. Note that the microwave furnace 24 having a continuous processing configuration adapted for continuous microwave synthesis does not have any susceptors 14. The reasoning for the absence of the susceptors 14 is that the starting material 20 is continuously fed through the microwave furnace 24 during processing and, therefore, the starting material 20 will be gradually preheated by the heat dissipated from the "hot zone" before entering the "hot zone." Specifically, upon initial start-up of the microwave furnace 24, a sufficient amount of time is required until the microwave furnace 24 is fully heated. Thereafter, the operation is in a stable condition and the zone distribution becomes fixed. However, this does not mean that susceptors may never be utilized in the continuous processing configuration, as susceptors may be used for energy distribution adjustment purposes.

An exemplary embodiment microwave processing procedure for phosphor synthesis will now be discussed. Various lamp phosphors were synthesized by the microwave processing technique of the present invention in a 6 kW batch multimode microwave furnace operating at 2.45 GHz. The phosphors included $Ca_{10}(PO_4)_6(Cl,F):Sb:Mn$ (Halophosphate); $Y_2O_3$:Eu (YOE or europium doped yttrium oxide), $BaMgAl_{10}O_{17}$ by itself or phase mixtures of $BaMgAl_{10}O_{17}$ plus $MgAl_2O_4$ and $Al_2O_3$, or some product where the chemical formula is $BaMg_{1+x}Al_{10+y}O_{17+z}$ where the x, y, and z numbers are 0<x<2.0, 0<y<5.0, and 0<z<10.5 (BAM or barium-magnesium aluminate); and $(La,Ce,Tb)PO_4$:Ce:Tb (LAP or lanthanum phosphate). Phosphors were prepared both with and without flux. In order to facilitate heat pickup at low temperatures, the microwave susceptor 14 was used. The temperature was measured with an optical pyrometer through the opening 28.

The general procedure started with placing 30–70 grams of starting material into an alumina crucible covered with a lid. The starting material was in the form of fine powder. If a special atmosphere was required, the microwave chamber was evacuated to 10 torr before filling in with the required gas. The starting material was then heated by microwave irradiation. The heating rate and the temperature were controlled through proper adjustment of the power level to a magnetron. Once the desired temperature was reached, the loaded material was soaked for a specified period of time and then cooled down by switching off the microwave power.

The microwave-synthesized products were characterized for particle size, brightness, phase composition, morphology, luminescence emission, color coordinates, etc. using test methods that are used for conventionally prepared phosphors.

EXAMPLE 1

Halophosphor
a. Pyrophosphate Synthesis

It was found that the conversion from $CaHPO_4$ (dicalcium phosphate) to $Ca_2P_2O_7$ (pyrophosphate) could be completed within 10 minutes at 450° C. by microwave processing. The weight loss and X-ray diffraction (XRD) of the product indicated that the conversion reaction was complete. The microwave converted powders were pure β-pyrophosphate and were finer than the conventional powder. When the temperature or treating time was increased, the particle size of the product increased. However, the microwave converted pyrophosphate powders were obviously finer than the conventionally converted product (See Table 1). The finer powder will be more reactive and thus facilitate the synthesis reaction. Pyrophosphate can be used for the synthesis of halophosphate phosphors.

TABLE 1

Median particle size of the microwave converted pyrophosphate

| Conventional | Microwaved Starting Material | | |
|---|---|---|---|
| | 800° C./20 min. | 450° C./35 min. | 450° C./20 min. |
| 7.58 μm | 6.40 μm | 6.15 μm | 5.75 μm | b. Calcium Halophosphate Synthesis

The microwave processing technique was used for the synthesis of a halophosphor (calcium chlorofluoroapatite doped with $Sb^{3+}$ and $Mn^{2+}$) from a mixture of raw materials. In order to simplify the synthesis process, dicalcium phosphate ($HCaPO_4$) was used in the starting mixture instead of pyrophosphate ($Ca_2P_2O_7$). Thus the microwave synthesis included both a pyrolysis and the formation of chlorofluoroapatite in a one-step synthesis. The raw starting mixture was composed of $HCaPO_4$, $CaCO_3$, $CaF_2$, $NH_4Cl$, $MnCO_3$, and $Sb_2O_3$. Typically, the halophosphate was synthesized by microwave processing at about 1000° C. for about 20 minutes. The microwave-synthesized phosphor showed the same phase, morphology, dopant incorporation, and properties as the control. It was found that using a shallow tray load of the starting mixture and a pure nitrogen flow helped improve the quality of the product.

In a typical schedule, microwave synthesis took 20 minutes soaking at the peak temperature, and 120 minutes total in heating. Microwave processing took only a fraction of the time necessary for conventional processing (typically 8–12 hours), thus providing opportunities for saving time and energy and increasing productivity.

Table 2 provides a comparison of X and Y color coordinates of the emission from a microwave-synthesized halophosphate phosphor compared with a conventional halophosphate phosphor. These phosphors were excited by 254 nm UV.

TABLE 2

C.I.E. color coordinates on a microwave-synthesized halophosphate phosphor sample

| | Control | Microwaved sample |
|---|---|---|
| X color | 0.4056 | 0.3951 |
| Y color | 0.4091 | 0.4112 |

EXAMPLE 2

BAM

Conventionally, $BaMgAl_{10}O_{17}$:Eu (BAM) is produced by firing the mixture of raw materials in a reducing atmosphere at 1600–1650° C. for two hours with $BaF_2$ as flux. The total firing process lasts 6–8 hours. In the conventional production of BAM, alumina crucibles are used in a pusher furnace. Each crucible can be used only for a limited number of runs.

a. BAM with Moderate Flux Level

Mixtures containing aluminum hydroxide, magnesium oxide, barium carbonate, and europium oxide with a moderate level of $BaF_2$ flux (10%) were fired in the microwave furnace. Temperatures ranged from about 1250° C. to about 1500° C. in an atmosphere of 25% $N_2$ and 75% $H_2$ for up to about 20 min. The fired phosphor remained loose, soft, and fine (See Table 3).

TABLE 3

Processing conditions and physical properties of the microwave BAM with flux

| Run No. | Temp. (° C.) | Atm. | Hold, min. | Powder/LOI | XRD |
|---|---|---|---|---|---|
| BAM 6 | 1500 | 25%$H_2$ | 2 | loose/30.77 | identical to control |
| BAM 7 | 1500 | 25%$H_2$ | 10 | loose/30.72 | identical to control |
| BAM 8 | 1400 | 25%$H_2$ | 10 | loose/30.72 | identical to control |
| BAM 9 | 1350 | 25%$H_2$ | 20 | loose/27.43 | identical to control |

Below 1350° C., a second phase appeared in the as-fired materials as a minor phase, thus the reaction was not 100% complete. At about 1400° C. or above, the reaction was complete. This was confirmed by both the loss on ignition (LOI) and x-ray diffraction patterns. All microwave-synthesized phosphors were easily screened to 160 μm without grinding. Table 4 lists the median particle size measured by Malvern and BET surface area of several microwave-synthesized BAM phosphors. Compared to the BET of 0.8–1.2 $m^2/g$ generally obtained by the conventional process in industry, the microwave-synthesized powders were obviously finer. In addition, microwave processing of BAM lowered the processing temperature by 200–250° C. and the processing time at peak temperature by 83% (20 minutes vs. 2 hours).

TABLE 4

Median particle size and specific surface area of the microwave-synthesized BAM phosphors with flux

| Run No. | Conditions | Atm | Median Particle Size (Malvern) μm | Surface Area (BET) $m^2/g$ |
|---|---|---|---|---|
| BAM 4 | 1470° C. × 5 min | 100%$N_2$ | 7.41 | 0.62 |
| BAM 5 | 1425° C. × 20 min | 25%$N_2$:75%$H_2$ | 4.85 | 1.35 |

TABLE 4-continued

Median particle size and specific surface area of the microwave-synthesized BAM phosphors with flux

| Run No. | Conditions | Atm | Median Particle Size (Malvern) μm | Surface Area (BET) m²/g |
|---|---|---|---|---|
| BAM 6 | 1500° C. × 2 min | 25%N₂:75%H₂ | 5.45 | 1.17 |
| BAM 7 | 1500° C. × 10 min | 25%N₂:75%H₂ | 5.08 | 1.36 |
| BAM 8 | 1400° C. × 10 min | 25%N₂:75%H₂ | 5.21 | 1.52 |
| BAM 9 | 1350° C. × 20 min | 25%N₂:75%H₂ | 5.27 | 1.65 | b. BAM with No Flux

Unfluxed BAM starting material was fired by microwave processing in 25% N₂/75% H₂ at temperatures between 1400–1500° C. as listed in Table 5.

TABLE 5

Microwave processing conditions and physical properties of unfluxed BAM phosphor

| Run No. | Temp. (° C.) | Hold, min. | Powder/LOI | XRD |
|---|---|---|---|---|
| BAM 10 | 1400 | 15 | white/loose/30.66 | Same as control* |
| BAM 11 | 1500 | 5 | white/loose/30.68 | Same as control* |
| BAM 12 | 1500 | 20 | white/loose/30.71 | Same as control* |

*but with a trace extra peak at 28.5° 2θ.

As the temperature increased, the powder was whiter. The LOI increased very little with temperatures from 1400–1500° C. In all the microwave-fired unfluxed BAM phosphors, there was a tiny peak at 28.5 deg. 2-theta of XRD pattern. For the unfluxed BAM mixture, the firing temperature in microwave synthesis should be above 1500° C. for the best reaction.

Figure 5:
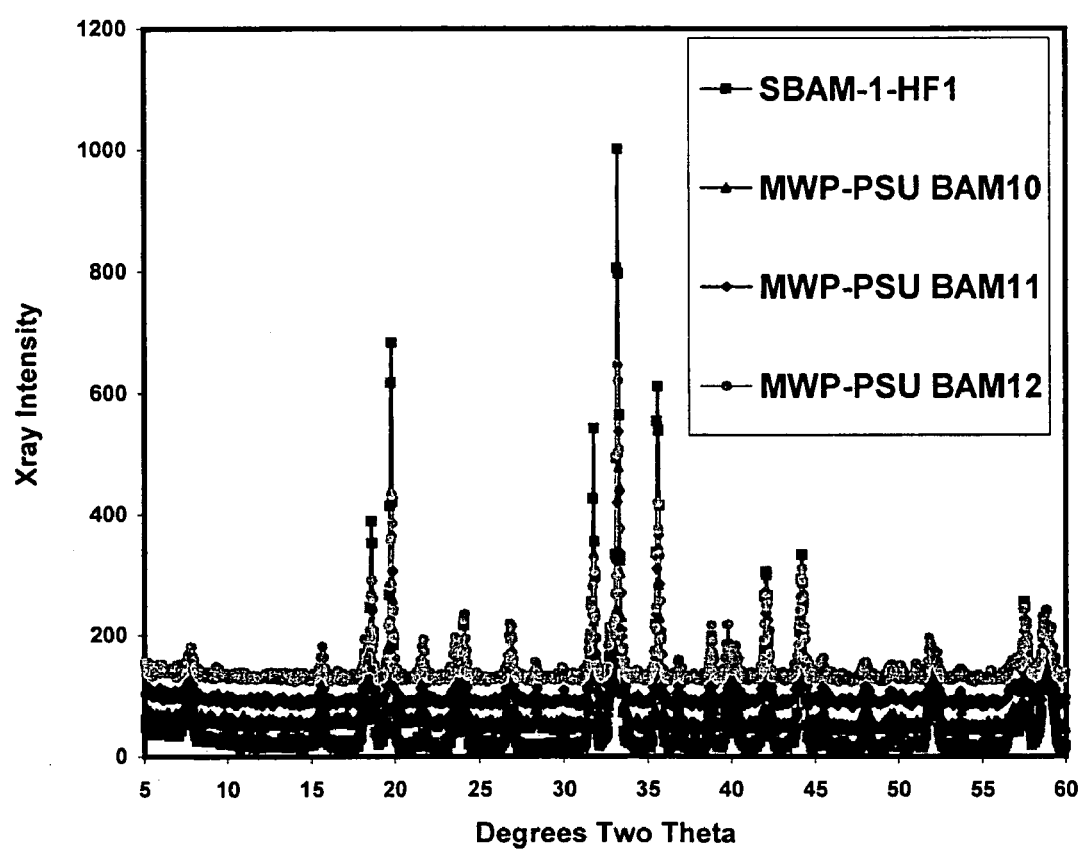
FIG. 5 is a graph showing X-ray diffraction (XRD) patterns of microwaved BAM and a conventional BAM (SBAM-1-HF1) phosphor.

X-ray diffraction patterns were obtained for several samples of microwaved BAM phosphors. As shown in FIG. 5, the patterns of phosphors both with and without flux are identical to the pattern of a conventional BAM.

EXAMPLE 3

LAP

Conventionally, LAP is prepared using fluxes such as boric acid ($H_3BO_3$) and lithium carbonate ($Li_2CO_3$) and is fired at 1200° C. for about four hours in a reducing atmosphere. The microwaved LAP phosphors were prepared from a mixed co-precipitate of lanthanum phosphate, cerium phosphate, and terbium phosphate. LAP phosphors with and without flux were synthesized. The microwave time and temperature conditions were varied (See Table 6). Preferably, the LAP phosphors are synthesized at about 800° C. to about 1125° C. for about 10 minutes to about 30 minutes.

TABLE 6

LAP phosphors synthesized by microwave processing

| Run No. | Type | Conditions | Atmosphere |
|---|---|---|---|
| LAP 1 | Unfluxed | 1125° C./30 min | 5%H₂/Ar |
| LAP 2 | Fluxed | 1100° C./10 min | 5%H₂/Ar |
| LAP 3 | Unfluxed | 900 ± 50° C./20 min | 5%H₂/Ar |
| LAP 4 | Unfluxed | 965 ± 65° C./20 min | 5%H₂/Ar |
| LAP 5 | Unfluxed | 910 ± 50° C./20 min | Static Air |

TABLE 6-continued

LAP phosphors synthesized by microwave processing

| Run No. | Type | Conditions | Atmosphere |
|---|---|---|---|
| LAP 6 | Unfluxed | 970 ± 75° C./20 min | Static Air |
| LAP 7 | Fluxed | 885 ± 75° C./10 min | 5%H₂/Ar |

These LAP phosphors were characterized by measuring the powder brightness compared with a conventional LAP phosphor. The median particle size was measured using a Malvern instrument before and after sonification. The span is a measure of the particle size distribution (See Table 7).

TABLE 7

Properties of LAP phosphors synthesized by microwave processing

| Run No. | % Brightness | Median Particle Size (Sonic Malvern) | Median Particle Size (Non-Sonic Malvern) | Span |
|---|---|---|---|---|
| LAP 1 | 103.5 | 5.40 | 5.92 | 1.344 |
| LAP 2 | 102.4 | 5.17 | 5.58 | 2.417 |
| LAP 3 | 100.0 | 4.69 | 5.66 | 1.115 |
| LAP 4 | 103.5 | 4.51 | 5.59 | 1.252 |
| LAP 5 | 95.4 | 4.81 | 5.63 | 1.237 |
| LAP 6 | 99.0 | 4.52 | 5.57 | 1.133 |
| LAP 7 | 96.6 | 4.84 | 8.71 | 2.448 |

Figure 6:
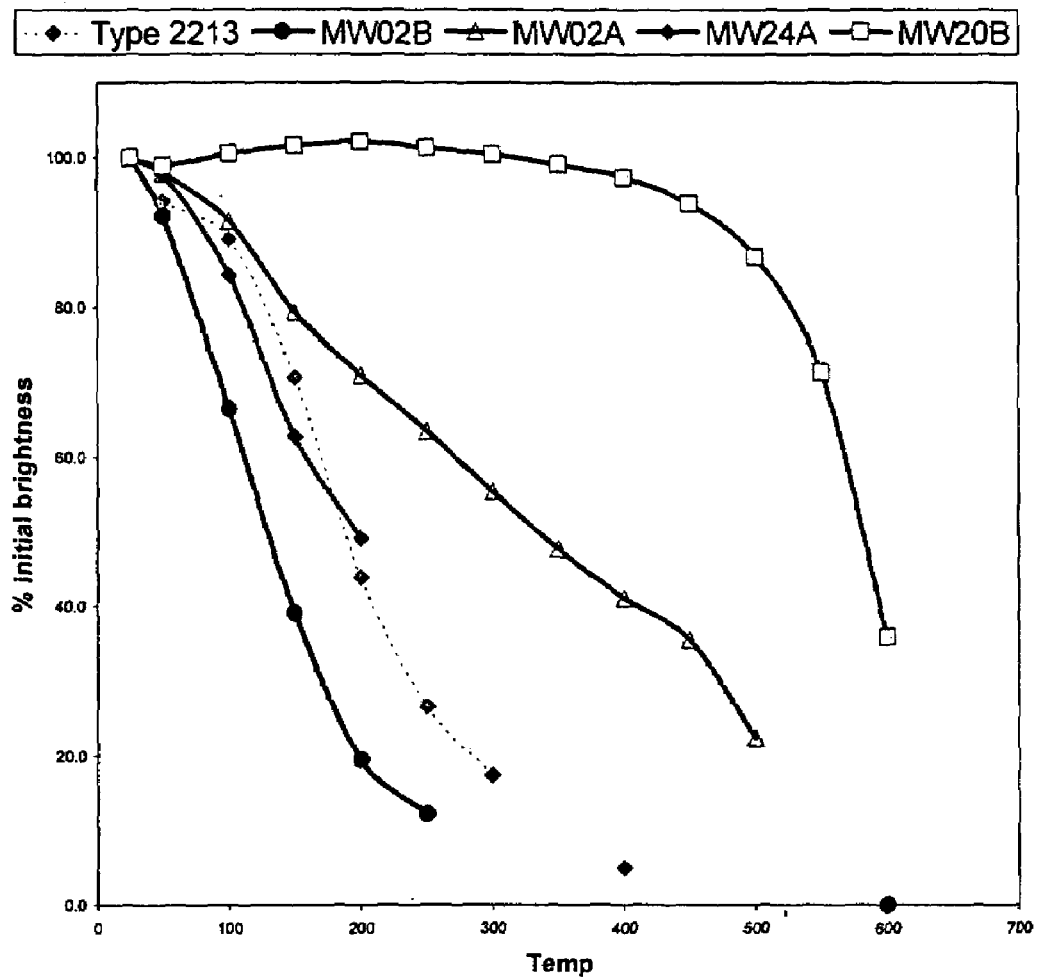
FIG. 6 is a graph showing thermal stability of microwave-synthesized LAP phosphors.

The thermal stability of several microwaved LAP phosphors was measured and compared with a conventional LAP phosphor. It was observed that the LAP made from unfluxed starting material showed better thermal stability than the LAP made from fluxed starting material, and the LAP made from starting material fired at a lower temperature showed better thermal stability than one made from starting material fired at a higher temperature. As shown in FIG. 6, the phosphor microwaved at 1020° C. for 10 minutes showed the best thermal stability.

Eight LAP phosphors (65 g per run on average) were fired by microwave processing under the same conditions with tight control of the heating process. The designed condition was 10 minutes at 1020° C. under flowing 5% H₂/Ar. The firing process was very stable for all the starting materials. The total heating process in the microwave chamber (including warm-up and hold) was about 90 minutes. All the resultant phosphors were white, clean, loose, and fine powders. These phosphors were prepared without any flux. The properties of these LAP phosphors are listed in Table 8. All these LAP phosphors again, showed excellent properties. The thermal stability of this batch was even better: there was no degradation up to 600° C. The low standard deviation between runs also indicated the excellent uniformity and reproducibility of the process.

TABLE 8

Properties of the microwave-synthesized LAP phosphors

| Run No. | % Brightness | X | Y | Median Particle Size (Malvern) | Span | Flux | Min | Temp (° C.) |
|---|---|---|---|---|---|---|---|---|
| LAP 8 | 104.8 | 0.341 | 0.577 | 5.89 | 1.604 | No | 10 | 1022 |
| LAP 9 | 105.2 | 0.340 | 0.577 | 5.33 | 1.248 | No | 10 | 1020 |
| LAP 10 | 106.2 | 0.339 | 0.578 | 5.48 | 1.299 | No | 10 | 1030 |
| LAP 11 | 105.3 | 0.340 | 0.577 | 5.65 | 1.182 | No | 10 | 1020 |
| LAP 12 | 104.4 | 0.340 | 0.577 | 5.55 | 1.137 | No | 10 | 1019 |
| LAP 13 | 106.3 | 0.342 | 0.578 | 5.57 | 1.138 | No | 10 | 1034 |
| LAP 14 | 105.6 | 0.340 | 0.577 | 5.45 | 1.211 | No | 10 | 1030 |
| LAP 15 | 107.3 | 0.340 | 0.578 | 5.71 | 1.275 | No | 10 | 1021 |
| Avg | 105.6 | 0.3403 | 0.5774 | 5.58 | 1.262 | | 10 | 1025 |
| Std Dev | 0.93 | 0.0009 | 0.0005 | 0.17 | 0.151 | | 0 | 5.86 |

The unfluxed LAP phosphor can be made by microwave processing at about 1020° C. with a 10-minute hold, whereas the fluxed LAP phosphor can be made at an even lower temperature within minutes. Compared to the conventional firing, microwave processing can save processing hold time by more than 95% and yet at a lower temperature. Microwave processing makes it possible to synthesize a LAP phosphor of high quality without using any flux.

EXAMPLE 4

YOE

The conventional process of producing YOE requires the firing of the raw materials at a maximum of 1300° C. in air for up to seven hours. The starting material is a mixed co-precipitate of yttrium oxide and europium oxide. Fluxes are normally used in this firing and can consist of lithium carbonate, potassium carbonate, and boric acid. Several YOE phosphors were prepared by microwaving the starting material at a range of times and temperatures. Both fluxed and unfluxed phosphors were processed. The starting materials were fired at temperatures from about 1100 to about 1350° C. at times from about ten minutes to about forty minutes.

Figure 7:
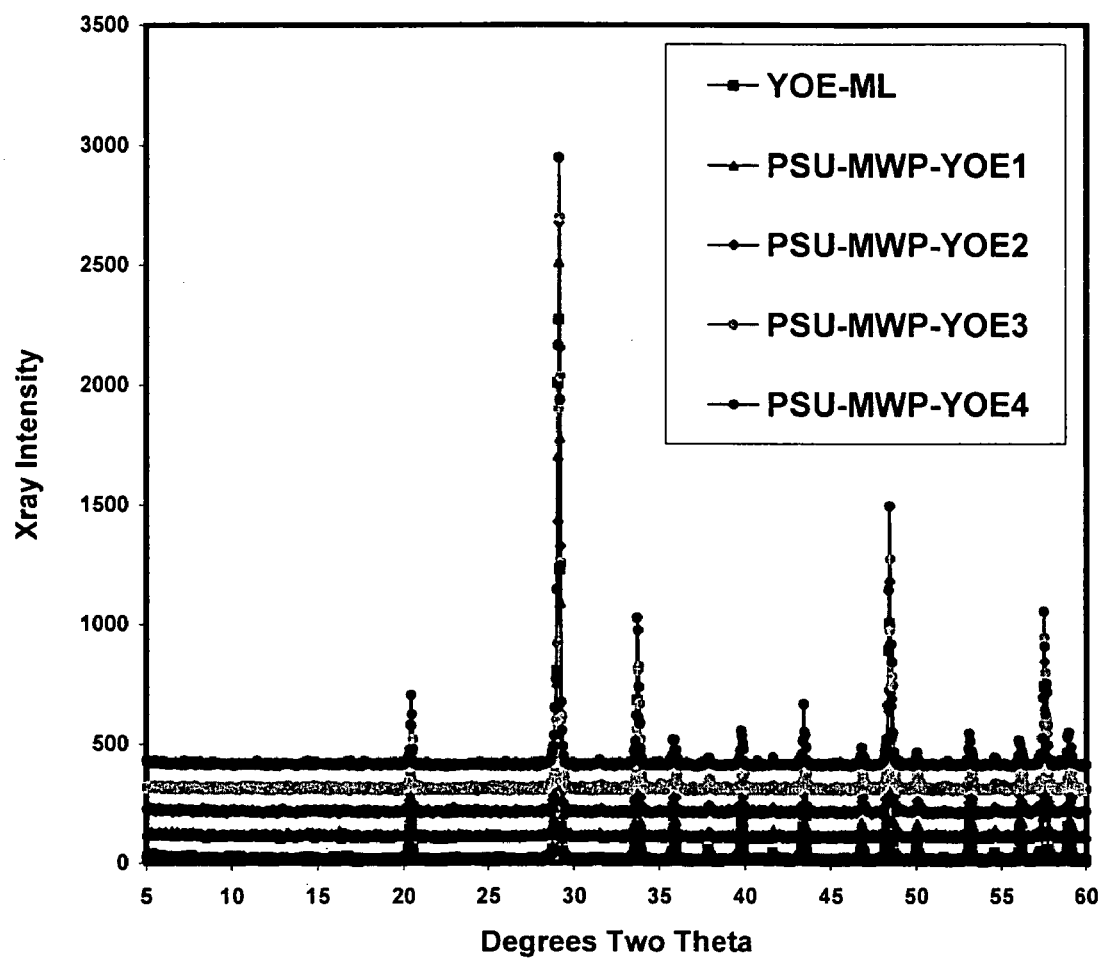
FIG. 7 is a graph showing x-ray diffraction patterns of microwave-synthesized unfluxed YOE phosphors in comparison with control YOE-ML materials, indicating the identical phase composition.
Figure 8:
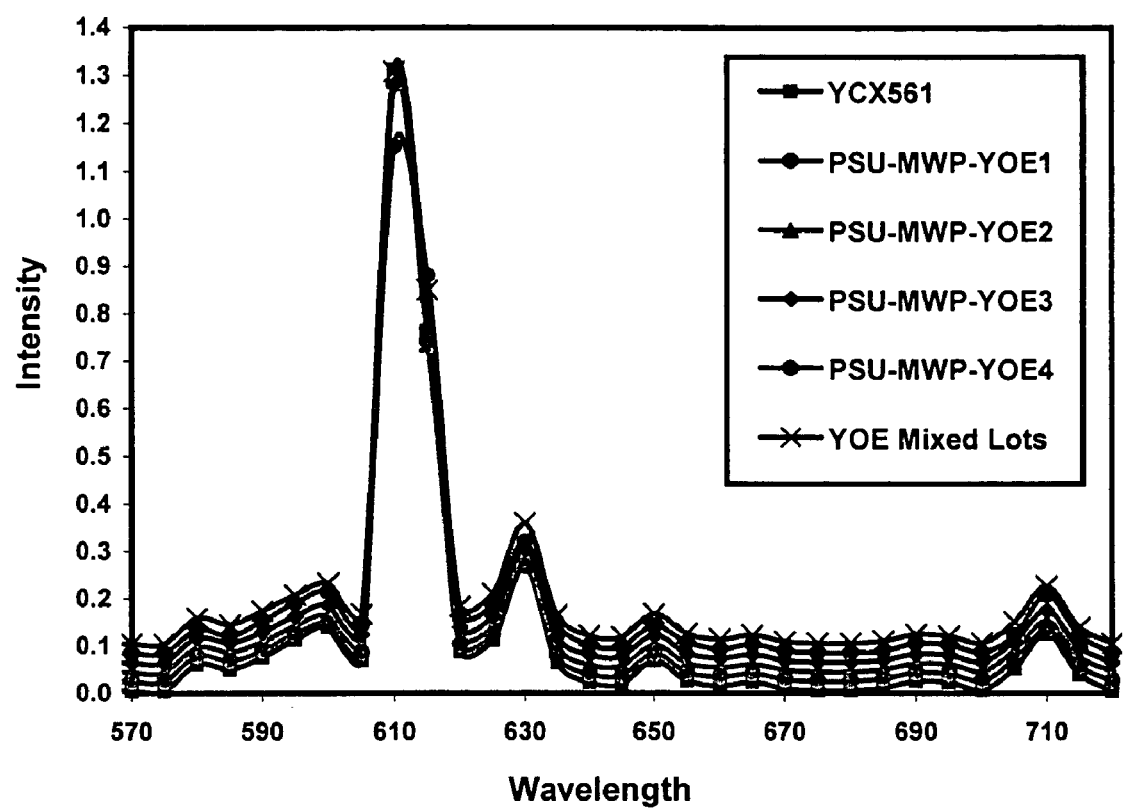
FIG. 8 is a graph showing the emission of microwave-synthesized YOE phosphors.

X-ray diffraction and emission tests were conducted on several unfluxed YOE phosphors synthesized in air by microwave processing at 1250–1325° C. (See Table 9). As shown in FIG. 7, the XRD patterns of the microwave-synthesized YOE phosphors are identical to the control. As shown in FIG. 8, the emission property under 254 nm excitation intensity varies with the firing conditions.

TABLE 9

Microwave firing conditions of unfluxed YOE phosphors

| Run No. | Conditions | Atm |
|---|---|---|
| YOE 1 | 1250° C./30 min | Air |
| YOE 2 | 1300° C./30 min | Air |
| YOE 3 | 1325° C./30 min | Air |
| YOE 4 | 1325° C./40 min | Air |

The morphology of the co-precipitate and the microwave-synthesized unfluxed YOE phosphors were studied by SEM. Compared with the unfired co-precipitate, that is loose and jagged, the microwave-synthesized phosphors showed bonding and coalition between primary particles, indicating that sintering has taken place during the short time of microwave processing.

A series of fluxed YOE phosphors were synthesized by microwave firing at 1200° C. for 20 minutes in air. The microwave synthesized YOE phosphors were softer than the conventional products. About 500 grams YOE phosphor powder was obtained by mixing several fluxed YOE phosphors synthesized by batch microwave processing. The mixed sample was washed in the same way as for the commercial products, and then used for a lamp test with conventionally synthesized commercial YOE phosphor as the control. It was found that the 100-hour lumens of the microwave synthesized YOE was 99.7% of the control. The 100-hour maintenance of the microwave synthesized YOE was 99% of the original. The microwave synthesized YOE under the above conditions showed comparable properties to the commercial product. Table 10 shows the firing conditions in microwave and conventional processing. Note, that in the microwave synthesis of these YOE phosphors, the firing time at the peak temperature was less than 5% of the conventional process, yet the temperature in microwave processing was 100° C. lower than that in the conventional process. This proves that microwave synthesis of phosphors can be commercialized to produce high quality products with substantial time and energy savings.

TABLE 10

Comparison of microwave synthesized fluxed YOE with conventional product

| Process | Conditions | 100-h lumens in lamp test |
|---|---|---|
| Conventional | 1300° C. × 7 hours, air | Standard |
| Microwave | 1200° C. × 20 min, air | 99.7% |

The morphology of unfluxed microwaved YOE is different from the conventional YOE phosphors synthesized with flux, in which particles have grown and have rounded edges. However, phosphors that were microwaved with flux show similar morphology to the conventional YOE. Compared to conventional firing, YOE phosphors can be synthesized by microwaving in much shorter times. This microwave process has the potential to save energy and time.

The present invention has been described with reference to the preferred embodiments. Obvious modifications, combinations, and alterations will occur to others upon reading the preceding detailed description. It is intended that the invention be construed as including all such modifications, combinations, and alterations insofar as they come within the scope of the appended claims or the equivalents thereof.

The invention claimed is:

1. A method for obtaining phosphors through microwave synthesis, the method comprising the steps of:
   providing an insulator having an opening therein, wherein the opening is substantially symmetrically disposed in relation to a central axis of the insulator, and wherein the opening is adapted to receive a phosphor starting material;
   depositing the starting material within the opening; and
   subjecting the phosphor starting material to microwaves.

2. The method of claim 1, further comprising the step of positioning a susceptor configuration within the cavity, wherein the susceptor configuration is substantially symmetrically disposed in relation to the central axis of the insulator.

3. The method of claim 1, wherein the insulator is comprised of refractory material that is essentially transparent to microwaves in a working temperature range.

4. The method of claim 3, wherein the insulator is comprised of one of aluminosilicate fibers and alumina fibers.

5. The method of claim 4, wherein the phosphor is one of halophosphate, barium-magnesium aluminate, lanthanum phosphate, and europium doped yttrium oxide.

6. The method of claim 1, further comprising the step of positioning a susceptor configuration within the cavity.

7. The method of claim 1, wherein the microwave furnace is adapted to be tilted by raising the first end of the tube to facilitate the movement of the starting material through the tube.

8. A method of synthesis of a phosphor by microwave processing, the method comprising the steps of:
   (a) providing a microwave furnace having a microwave chamber;
   (b) providing a phosphor starting material in the microwave chamber; and
   (c) subjecting the phosphor starting material to microwaves, whereby the starting material is synthesized into a phosphor.

9. The method of claim 8, wherein the phosphor is a halophosphate phosphor.

10. The method of claim 9, wherein the phosphor is represented by $Ca_{10}(PO_4)_6(Cl,F):Sb:Mn$.

11. The method of claim 9, wherein the phosphor is synthesized by microwave processing at about 1000° C.

12. The method of claim 10, wherein the starting material comprises a mixture of $HCaPO_4$, $CaCO_3$, $CaF_2$, $NH_4Cl$, $MnCO_3$ and $Sb_2O_3$.

13. The method of claim 12, wherein the phosphor is synthesized by microwave processing at about 1000° C. for about 20 minutes.

14. The method of claim 8, wherein the phosphor is a barium-magnesium aluminate.

15. The method of claim 14, wherein the phosphor is represented by $BaMg_{1+x}Al_{10+y}O_{17+z}$, wherein $0<x<2.0$, $0<y<5.0$, and $0<z<10.5$ and the phosphor has a europium activator.

16. The method of claim 14, wherein the phosphor is synthesized by microwave processing in a reducing atmosphere at about 1250° C. to about 1500° C.

17. The method of claim 16, wherein the phosphor is synthesized by microwave processing at about 1400° C. to about 1500° C.

18. The method of claim 15, wherein the starting material is a mixture of aluminum hydroxide, magnesium oxide, barium carbonate, europium oxide and a barium fluoride flux.

19. The method of claim 18, wherein the phosphor is synthesized by microwave processing in a reducing atmosphere at about 1250° C. to about 1500° C. for about 20 minutes.

20. The method of claim 8, wherein the phosphor is a lanthanum phosphate.

21. The method of claim 20, wherein the phosphor is represented by $(La, Ce, Tb)PO_4:Ce:Tb$.

22. The method of claim 20, wherein the phosphor is synthesized by microwave processing at about 800° C. to about 1125° C.

23. The method of claim 21, wherein the starting material is a coprecipitate mixture of lanthanum phosphate, cerium phosphate and terbium phosphate.

24. The method of claim 21, wherein the starting material further includes a flux.

25. The method of claim 23, wherein the phosphor is synthesized by microwave processing at about 800° C. to about 1125° C. for about 10 to about 30 minutes.

26. The method of claim 8, wherein the phosphor is a europium doped yttrium oxide.

27. The method of claim 26, wherein the phosphor is synthesized by microwave processing at about 1100° C. to about 1350° C.

28. The method of claim 26, wherein the starting material is a mixture of yttrium oxide and europium oxide.

29. The method of claim 28, wherein the phosphor is synthesized by microwave processing at about 1100° C. to about 1350° C. for about 10 minutes to about 40 minutes.

30. The method of claim 29, wherein the mixture further includes a flux.

31. The method of claim 8, wherein the phosphor is synthesized without a flux.

* * * * *